(12) United States Patent
Shibui

(10) Patent No.: US 11,631,033 B2
(45) Date of Patent: Apr. 18, 2023

(54) ON-DEVICE TRAINING OF PERSONALIZED MODEL

(71) Applicant: MERCARI, INC., Tokyo (JP)

(72) Inventor: Yusuke Shibui, Tokyo (JP)

(73) Assignee: MERCARI, INC., Tokyo (JP)

( * ) Notice: Subject to any disclaimer, the term of this patent is extended or adjusted under 35 U.S.C. 154(b) by 397 days.

(21) Appl. No.: 16/920,438

(22) Filed: Jul. 3, 2020

(65) Prior Publication Data
US 2022/0004916 A1 Jan. 6, 2022

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

| 10,884,589 B2 * | 1/2021 | Pike | G06F 3/04842 |
|---|---|---|---|
| 11,316,600 B2 * | 4/2022 | Zhu | H04B 17/345 |
| 11,403,540 B2 * | 8/2022 | Sanketi | G06N 5/048 |
| 2022/0052925 A1 * | 2/2022 | Vandikas | H04L 41/16 |

OTHER PUBLICATIONS

Brisimi, Elsevier, 2018, pp. 59-67.*
Huang, Elsevier, 2019, pp. 1-13.*
Jain, 2019, IEEE sections I-VI.*
Qian, Elsevier, 2019, pp. 562-570.*

* cited by examiner

*Primary Examiner* — Michael I Ezewoko
(74) *Attorney, Agent, or Firm* — Morgan, Lewis & Bockius LLP

(57) ABSTRACT

Methods related to a model training scheme performed on a computing device are described. The computing device may include a display module and a memory module storing multiple prediction models and item data that includes data of multiple items. Example methods may include displaying, on the display module, a first representation of at least one modality of one or more items among the multiple items; detecting an activity of a user of the computing device in response to displaying of the at least one modality of the one or more items to generate user activity log data; and evaluating at least one first prediction model of the multiple prediction models based on the user activity log data to generate an evaluation value of the at least one first prediction model. The at least one first prediction model may be related to a prediction of the one or more items.

17 Claims, 19 Drawing Sheets

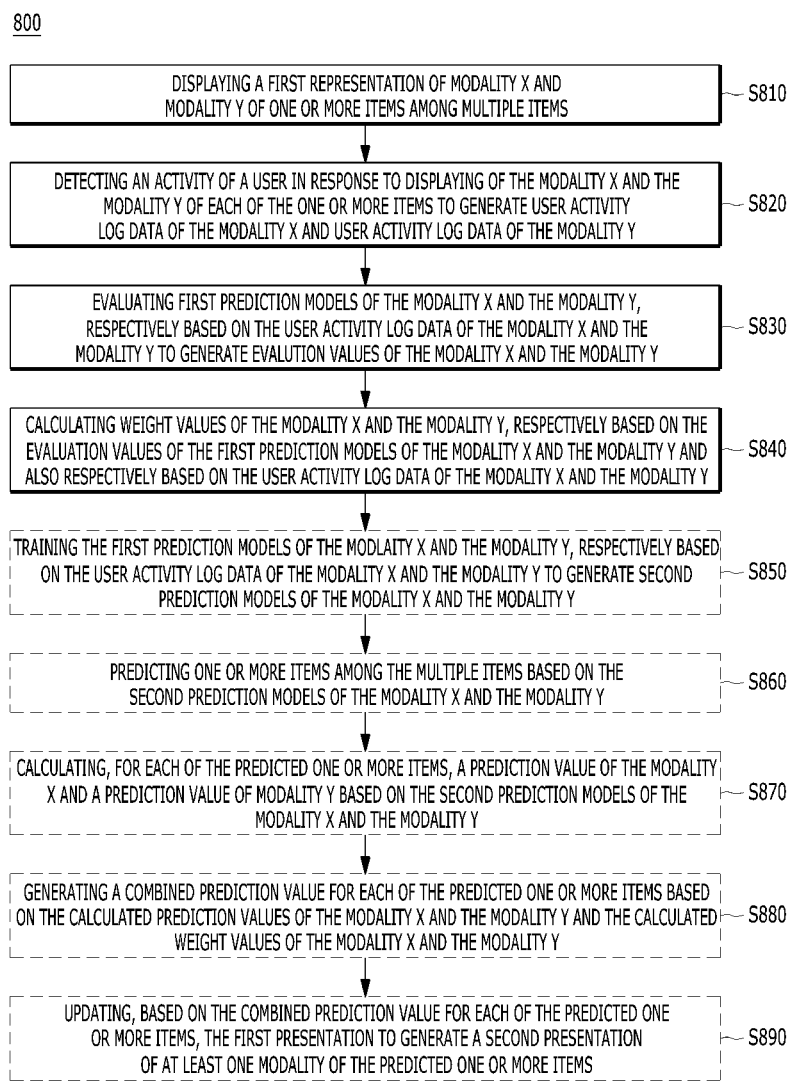

FIG. 9A

| Item_id | Image_interest | Img_pred_model 2 | Text_Interest | Text_pred_model 2 |
|---|---|---|---|---|
| m1111 | 0 | 0 | 0 | 1 |
| m2222 | 0 | 0 | 1 | 0 |
| m3333 | 1 | 1 | 0 | 0 |
| m4444 | 1 | 1 | Null | 1 |
| ... | ... | | ... | |
| Interest Rate | 0.50 | – | 0.33 | – |

FIG. 9B

| Image_model | Evaluation Value | Weight Value | Trained_time stamp |
|---|---|---|---|
| 1 | 0.7 | 0.35 | 2020.05.15 00:00:00 |
| 2 | 1.0 | 0.5 | 2020.05.15 00:02:00 |

FIG. 9C

| Text_model | Evaluation Value | Weight Value | Trained_time stamp |
|---|---|---|---|
| 1 | 0.5 | 0.165 | 2020.05.15 00:01:00 |
| 2 | 0.6 | 0.198 | 2020.05.15 00:05:00 |

FIG. 13A

Image feature vector cache

| Item_id | image_feature |
|---|---|
| m1111 | [0, 0, 0, 0, 0, 0, 1, 1, 1...] |
| m2222 | [0, 0, 0, 0, 1, 1,, 1, 1, 1...] |

FIG. 13B

Image prediction cache

| Image_model | Item_id | Prediction |
|---|---|---|
| 1 | m1111 | 0 |
| 1 | m2222 | 1 |
| 2 | m1111 | 1 |
| 2 | m2222 | 1 |

FIG. 13C

Text feature vector cache

| Item_id | Text_feature |
|---|---|
| m1111 | [0, 1, 0, 0, 0, 0, 1, 1, 1...] |
| m2222 | [0, 0, 1, 0, 1, 1,, 1, 1, 1...] |

FIG. 13D

Text prediction cache

| Text_model | Item_id | Prediction |
|---|---|---|
| 1 | m1111 | 1 |
| 1 | m2222 | 0 |
| 2 | m1111 | 1 |
| 2 | m2222 | 0 |

ON-DEVICE TRAINING OF PERSONALIZED MODEL

BACKGROUND

Unless otherwise indicated herein, the approaches described in this section are not prior art to the claims in this application and are not admitted to be prior art by inclusion in this section.

Commercial transactions through a network, so called e-commerce, have been increased over recent years, and their market is expected to be increased more and to gradually substitute for a conventional offline market in the future. As machine learning techniques have been developed, various service providers, who provide services such as, for example, e-commerce, SNS (social network service), VOD (video on demand), customized video contents for digital signages, etc., are trying to apply machine learning models into their services. In order to provide optimized services using a machine learning model, training of the model is required to be performed frequently or periodically. Such training is typically performed at a server side since the computing capability of a server is usually higher than that of a user device.

Recently, in order to accurately reflect preferences of respective users to e-commerce services, use of a personalized model is being considered. However, when providing a prediction model personalized to each user, a user device is required to transmit, to a server, user information regarding tendencies and/or statistics of user's behavior frequently or periodically. This may make it difficult to reflect the current interest of the user and also may cause problems regarding privacy-related issues. Further, the more the number of users is, the higher the load of the server for training personalized models becomes.

SUMMARY

Technologies generally described herein relate to a model training scheme. Various example methods performed on a computing device are described. The computing device may include a display module and a memory module, wherein the memory module is configured to store a plurality of prediction models and item data that includes data of a plurality of items. Example methods may include displaying, on the display module, a first representation of at least one modality of one or more items among the plurality of items; detecting an activity of a user of the computing device in response to displaying of the at least one modality of the one or more items to generate user activity log data; and evaluating at least one first prediction model of the plurality of prediction models based on the user activity log data to generate an evaluation value of the at least one first prediction model. The at least one first prediction model may be related to a prediction of the one or more items.

In some examples, the evaluating may include evaluating of at least one other prediction model of the plurality of prediction models to generate an evaluation value of the at least one other prediction model. The methods may further comprise determining at least one prediction model based on the respective evaluation values of the at least one first prediction model and the at least one other prediction model; and training the determined at least one prediction model based on the user activity log data to generate at least one second prediction model. The methods may further comprise updating, based on the generated at least one second prediction model, the first representation to generate a second representation of at least one modality of one or more items among the plurality of items to be displayed on the display module.

In some other examples, the at least one modality may include a plurality of modalities and the at least one first prediction model may include a plurality of first prediction models. In such examples, the methods may further comprises calculating weight values of the plurality of modalities based on the evaluation values of the plurality of first prediction models and the user activity log data; training the plurality of first prediction models based on the user activity log data to generate a plurality of second prediction models; predicting one or more items among the plurality of items to be presented to the user of the computing device based on the plurality of second prediction models; calculating, for each of the predicted one or more items, prediction values of the plurality of modalities based on the plurality of second prediction models; and generating a combined prediction value for each of the predicted one or more items based on the calculated prediction values and the calculated weight values. The methods may further comprise updating, based on the combined prediction value for each of the predicted one or more items, the first representation to generate a second representation of at least one modality of the predicted one or more items to be displayed on the display module.

In some examples, computing devices for providing model training are described. Example computing devices may include a processor, a display module, and a memory module. The memory module may be configured to store a plurality of prediction models and item data that includes data of a plurality of items. The memory module may be further configured to store instructions. The processor may execute the instructions to perform operations. The operations may comprise displaying, on the display module, a first representation of at least one modality of one or more items among the plurality of items; detecting an activity of a user of the computing device in response to displaying of the at least one modality of the one or more items to generate user activity log data; and evaluating at least one first prediction model of the plurality of prediction models based on the user activity log data to generate an evaluation value of the at least one first prediction model. The at least one first prediction model may be related to a prediction of the one or more items.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates an example flow diagram of another process for providing model training, arranged in accordance with at least some embodiments described herein;

FIG. 9A shows an example table including user interest values and prediction values for respective items and modalities and FIGS. 9B and 9C shows example tables including evaluation values and weight values of respective models regarding each modality, arranged in accordance with at least some embodiments described herein;

FIGS. 13A and 13B show example cache tables of feature vector cache and FIGS. 13C and 13D show example cache tables of prediction cache, arranged in accordance with at least some embodiments described herein;

DETAILED DESCRIPTION

Figure 1:
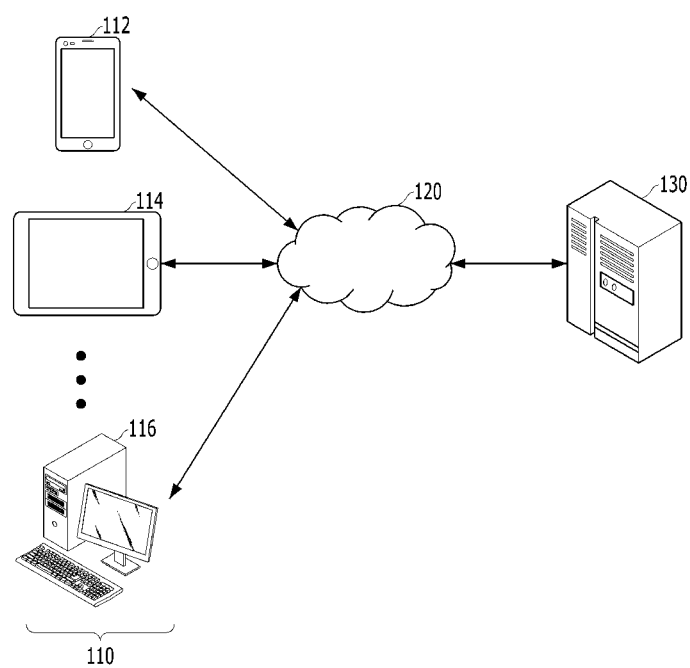
FIG. 1 shows a diagram of an example model training system where a user device is configured to communicate with a server via a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, systems, devices, and computer-readable storage media related to model training.

Briefly stated, technologies are generally described for providing a model training scheme. In some examples, a user may want to see one or more items to be displayed on a user device, and the user device may execute an application according to the present disclosure. The user device may have item data stored in its memory module, which includes data of a plurality of items. The item data may include, for example, categories, brand names, descriptions, images, feature data of the plurality items, etc. In some examples, the user device may receive the item data from a server communicatively connected with the user device. Further, the user device may have a plurality of prediction models stored in the memory module. Each prediction model may be used to predict a preference and/or activity of the user in response to showing of an item and may be related with a modality of the item. The modality may include, for example, text, image, numeric, etc.

The user device may predict one or more items among the plurality of items based on at least one first prediction model among the plurality of prediction models and generate a first representation of the predicted one or more items. In some examples, before predicting the one or more items, the user device may store preprocessed item data for the prediction in its cache module. For example, the preprocessed item data may include an extracted feature vector of each of at least one modality of each of the plurality of items. In some other examples, the user device may prepare the first representation in the background and store it in the cache module. The first representation may include a prediction value for at least one modality of each of the one or more items.

The user device may display the first representation of the at least one modality of the one or more items. In response to displaying the first representation and/or displaying the at least one modality in the first representation, the user of the user device may make an activity using the user device. Such activity may be related to an item and/or the at least one modality of such item. In an example, the user may select one of a plurality of buttons with regard to an item displayed on the user device. In another example, the user may select one of a plurality of buttons relating to a modality of the item. In yet another example, the user may spend a time period while the user is looking at the modality of the item. The user may make any other activities with regard to the modality of the item. The user device may detect the activity of the user and generate user activity log data based on the detected activity of the user.

The user device may evaluate the at least one first prediction model based on the user activity log data to generate an evaluation value of the at least one first prediction model. Further, the user device may generate and/or obtain at least one second prediction model based on the user activity log data.

In some examples, the user device may train the at least one first prediction model based on the user activity log data to generate at least one second prediction model. In other examples, in addition to evaluating the at least one first prediction model, the user device may also evaluate at least one other prediction model to generate an evaluation value of the at least one other prediction model. In such examples, the user device may determine at least one prediction model based on the respective evaluation values of the at least one first prediction model and the at least one other prediction model. Then, the user device may train the determined at least one prediction model based on the user activity log data to generate at least one second prediction model. The user device may initiate and/or stop training of the prediction model when at least one of predetermined conditions is met. In yet other examples, if the evaluation value of the at least one first prediction model is below a predetermined value, the user device may receive at least one second prediction model from a server communicatively connected with the user device.

In some examples, the user device may update the first representation based on the at least one second prediction model to generate a second representation of at least one modality of one or more items among the plurality of items.

FIG. 1 shows a diagram of an example model training system where a user device is configured to communicate with a server via a network, arranged in accordance with at least some embodiments described herein. As depicted, a model training system 100 may include a user device 110, a network 120 and a server 130.

User device 110 may be any type of computing device, such as a user device 112, 114, . . . or 116 that is configured to communicate with server 130 via network 120. User device 110 may download, from server 130 via network 120, an application program that provides, among others, an item search service and a model training service on user device 110. Otherwise, user device 110 may download the application program from an application providing server, such as Google Play store™, App Store™, etc. Various types of user device 110 may include, but are not limited to, a desktop computer, a mobile computer (e.g., a laptop, an ultra-book, a netbook), a mobile phone (including a smart phone), a tablet computer and/or a personal digital assistant (PDA).

User device 110 may access server 130 via network 120. Network 120 may be any wired network, wireless network, or combination thereof. In addition, network 120 may include, but not limited to, a personal area network, a local area network, a wide area network, a cable network, a satellite network, a cellular telephone network, or combination thereof. For example, network 120 may be a publicly accessible network of linked networks, possibly operated by various distinct parties, such as the Internet. In some embodiments, network 120 may be a private or semi-private network, such as a corporate or university intranet. Network 120 may include one or more wireless networks, such as a Code Division Multiple Access (CDMA) network, a Long Term Evolution (LTE) network, a Long Term Evolution-Advanced (LTE-A) network, Interoperability for Microwave Access (WiMax) network, Wireless Fidelity (Wi-Fi) network and any other type of wireless network. For example, the protocols used by network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Server 130 may be implemented as a single computing device, a server farm comprising multiple servers, a distributed network, a cloud-computing configuration, and/or the like. Server 130 may store and manage item data that includes data of a plurality of items. The item data may include, for example, categories, brand names, descriptions, images, feature data of the plurality items, etc. Further, server 130 may store and manage a plurality of the prediction models of the plurality of modalities as default prediction models. In some examples, server 130 may store user information including, for example, age, gender, location, address, profession, etc. for a plurality of users. In such examples, server 130 may categorize the users into several user groups based on the user information and may manage a plurality of prediction models of the plurality of modalities for each user group.

User device 110 may receive the item data from server 130 and store it in its memory module. User device 110 may receive the item data, for example, periodically; when user device 110 executes the application program; when user device 110 accesses server 130 to update the item data during running the application program; or when user device 110 receives a request from a user of user device 110.

User device 110 may receive, from server 130, the plurality of prediction models relating to the user of user device 110 and store them in the memory module. User device 110 may receive the plurality of prediction models, for example, when user device 110 installs the application program; when user device 110 executes the application program to access server 130; when user device 110 detects a predetermined condition; or when user device 110 receive a request from a user of user device. Each prediction model is related to a modality of items, such as text, image, numeric, etc.

In some embodiments, user device 110 may predict one or more items among the plurality items based on at least one first prediction model among the plurality of prediction models and may generate a first representation for the predicted one or more items. In some examples, before predicting the one or more items, user device 110 may receive preprocessed item data from server 130. In some other examples, before predicting the one or more items, user device 110 may preprocess the item data to obtain the preprocessed item data. User device 110 may preprocess the item data, for example when user device 110 is in an idle state; when user device 110 is being charged; when a current time is within a time period set by the user; or during any application program is running. The preprocessed item data may include an extracted feature vector for each modality of each item. For example, the preprocessed item data may include a feature vector for text of an item and a feature vector for images of the item. User device 110 may store the preprocessed item data in a cache module and obtain the preprocessed item data from the cache module to predict the one or more items based on the at least one first prediction model.

In some examples, user device 110 may receive an input from the user of user device 110. In response to the receiving of the input, user device 110 may obtain the preprocessed item data from the cache module and predict the one or more items that are related with the input from the user. User device 110 may calculate a prediction value for each of the one or more items based on the at least one first prediction model and by using the preprocessed item data. User device 110 may prepare the first representation based on the prediction value for each of the one or more items.

Alternatively, user device 110 may store the first representation in the cache module. User device 110 may prepare the first representation, for example, when user device 110 is in an idle state; when user device 110 is being charged; when a current time is within a time period set by the user; or during any application program is running. The stored first representation may include a prediction value for at least one modality of each of one or more predicted items. Then, user device 110 may obtain the first representation from the cache module.

In some embodiments, the first representation may include at least one modality of the one or more items. User device 110 may display the first representation of the at least one modality of the one or more items.

In some embodiments, user device 110 may detect an activity of a user of user device 110 in response to displaying of the at least one modality of the one or more items to generate user activity log data. In response to displaying the first representation and/or displaying the at least one modality in the first representation, the user may make an activity using user device 110. Such activity may be related to an item among the one or more items in the first representation and/or the at least one modality of the item. In an example, the user may select one of a plurality of buttons with regard to an item displayed on the user device. For example, the user may select a "like" button, an "unlike" button or a "next" button for the displayed item, where selecting the "like" button may correspond to a positive activity of the user for the displayed item, selecting the "unlike" button may correspond to a negative activity of the user for the displayed item and selecting the "next" button may not be related to the preference of the user. In another example, the user may select one of a plurality of buttons relating to a modality of the item. For example, the user may select a button for flipping multiple photos for the item or drag a bar for going up and down a text portion for the item. In yet another example, the user may spend a time period while the user is looking at the modality of the item. The activity of the user to be detected by user device 110 is not limited to the above examples, and the other user activities with regard to the item or the modality of the item are applicable.

In some embodiments, user device 110 may evaluate the at least one first prediction model based on the user activity log data to generate an evaluation value of the at least one first prediction model. In some examples, the generated evaluation value may be related to user activity for a modality. The evaluation value may include for example, an accuracy, a degree of precision, a recall value, a F1 score and the like of the prediction of the user activity.

User device 110 may obtain at least one second prediction model based on the user activity log data. In some examples, user device 110 may train the at least one first prediction model based on the user activity log data to generate the at least one second prediction model. User device 110 may train the at least one first prediction model using the user activity log data and store the trained at least one first prediction model as the at least one second prediction model, while maintaining the at least one first prediction model in its memory module. When user device 110 detects another activity of the user to generate another user activity log data, user device 110 evaluates the at least one second prediction model based on the other user activity data to generate a second evaluation value. If a second evaluation value is below a predetermined value, user device 110 may select the maintained at least one first prediction model and train it based on the other user activity log data to generate at least one third prediction model. Otherwise, if the second evaluation value is not below the predetermined value, user device 110 may train the at least second prediction model to generate at least one third prediction model.

In other examples, in addition to evaluating the at least one first prediction model, user device 110 may also evaluate at least one prediction model other than the at least one first prediction model. User device 110 may generate an evaluation value of the at least one other prediction model. In such examples, user device 110 may determine at least one prediction model based on the respective evaluation values of the at least one first prediction model and the at least one other prediction model. For example, user device 110 may compare the evaluation values of the at least one first prediction model and the at least one other prediction model to determine the at least one prediction model. Then, user device 110 may train the determined at least one prediction model based on the user activity log data to generate at least one second prediction model.

In yet other examples, if the evaluation value of the at least one first prediction model is below a predetermined value, user device 110 may transmit a request for a prediction model to server 130. In response to the request from user device 110, server 130 may transmit at least one prediction model among the plurality of the prediction models managed in server 130. For example, server 130 may determine the at least one prediction model based on the user information of the user of user device 110 and transmit the determined at least one prediction model to user device 110. User device 110 may receive the at least one prediction model from server 130 and store it as the at least one second prediction model for use in a next prediction.

In some examples, user device 110 may initiate training of the prediction model when a predetermined condition is met. By way of example, but not limitation, the predetermined condition to initiate the training includes at least one of the following conditions: a) when the amount of the generated user activity log data is above or below a first predetermined value; b) when the generated evaluation value is above or below a second predetermined value; c) when user device 110 is in an idle state; d) when user device 110 is being charged; and e) when a current time is within a time period set by the user.

In some examples, user device 110 may stop training of the prediction model when a predetermined condition is met. By way of example, but not limitation, the predetermined condition to stop the training includes at least one of the following conditions: a) when user device 110 is executing an operation that requires a CPU usage over a third predetermined value; and b) when user device 110 is executing an operation that relates to on line sales or on line payment.

In some examples, user device 110 may update the first representation based on the at least one second prediction model to generate a second representation of at least one modality of one or more items among the plurality of items. In some examples, user device 110 may predict, based on the at least one second prediction model, one or more items among the plurality of items in the item data and generate the second representation of the predicted one or more items. In some other examples, user device 110 may calculate a prediction value for each of the predicted one or more items using the at least one second prediction model and may adjust the arrangement of the first representation based on the calculated prediction values to generate the second representation. For example, user device 110 may sort the one or more items, filter some of the one or more items, or change the position of modalities of an item of the one or more items.

In some examples, the at least one modality may include a plurality of modalities and the at least one first prediction model may include a plurality of first prediction models. Each of the plurality of first prediction model is related to each modality of the plurality of modalities. For example, the plurality of first prediction models may include at least two first prediction models including a first prediction model for text, a first prediction model for image, a first prediction model for numeric, etc. In such examples, user device 110 may obtain a plurality of second prediction models. User device 110 may calculate weight values for the plurality of modalities of the plurality of first prediction models. Each of weight values may be related to user's relative preference to one modality to other modality(es) and may be calculated based on the evaluation value of each of the plurality of first prediction models and the user activity log data. For example, if a weight value of the first prediction model for text is bigger than that of the first prediction model for image, that means the user may prefer reading the text than watching the image. Meanwhile, based on the plurality of second prediction models, the user device may predict one or more items among the plurality of items and calculate, for each of the predicted one or more items, prediction values of the plurality of modalities. Then, user device 110 may generate a combined prediction value for each of the predicted one or more items based on the calculated prediction values and weight values. User device 110 may update, based on the combined prediction value for each of the predicted one or more items, the first representation to generate the second representation.

The model training on a user device in accordance with the present disclosure makes it possible to keep user activity log, which may be related to privacy of users, in the user device for security. Further, it is possible to train, on the user device, the prediction model based on the user activity regarding the at least one modality to reflect the current interest of the user.

Figure 2:
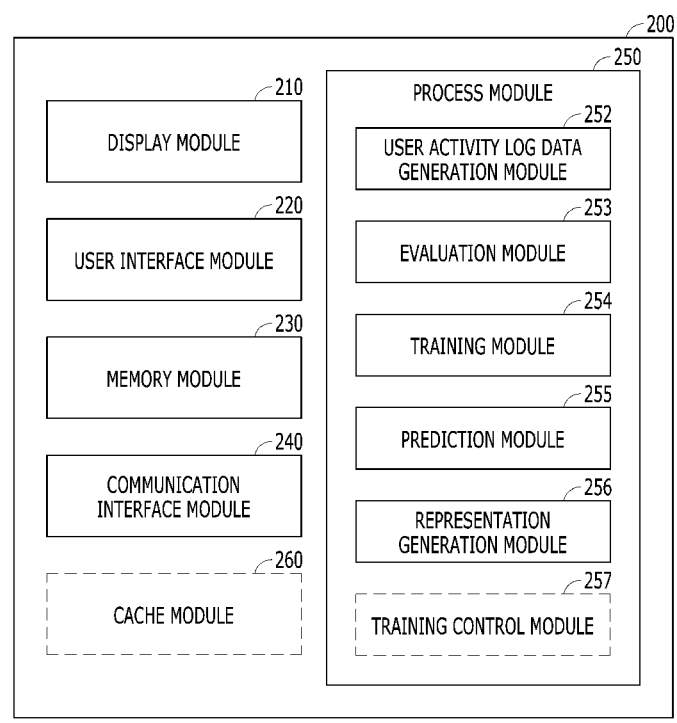
FIG. 2 shows a block diagram of an example user device, arranged in accordance with at least some embodiments described herein.

FIG. 2 shows a block diagram of an example user device, arranged in accordance with at least some embodiments described herein. As illustrated, a user device 200 may include a display module 210, a user interface module 220, a memory module 230, a communication interface module 240 and a process module 250. Additionally or optionally, user device 200 may further include a cache module 260. Process module 250 may include a user activity log data generation module 252, an evaluation module 253, a training module 254, a prediction module 255 and a representation generation module 256. Additionally or optionally, process module 250 may further include a training control module 257. User device 200 may be implemented as any type of computing device, such as a desktop computer, a mobile computer (e.g., a laptop, an ultra-book, a netbook), a mobile phone (including a smart phone), a tablet computer and/or a personal digital assistant (PDA).

In some embodiment, memory module 230 may be configured to store item data and a plurality of prediction models. The item data may include data of a plurality of items. The item data may include, for example, categories, brand names, descriptions, images, feature data of the plurality items, etc. Each of the plurality of prediction models may be related to a modality of items, such as, text, image, numeric, etc.

Communication interface module 240 may be configured to communicate with a server (such as, for example, server 130 in FIG. 1) via a network (such as, for example, network 120 in FIG. 1) to exchange data. In some examples, communication interface module 240 may receive item data from the server. Communication interface module 240 may transmit a request for the item data to the server, for example, periodically; when executing the application program; when accessing the server to update the item data during running the application program; or when receiving a request from a user of user device 200. Further, communication interface module 240 may receive a plurality of prediction models from the server. For example, communication interface module 240 may receive the plurality of prediction models, when installing or executing the application program; or in response to detecting a predetermined condition or receiving a request from the user of user device 200.

In some embodiments, display module 210 may be configured to display a first representation. The first representation may include at least one modality of one or more items among the plurality of items. Prediction module 255 may be configured to predict the one or more items among the plurality of items based on at least one first prediction model among the plurality of prediction models. In some examples, before display module 210 displays the first representation, user interface module 220 may receive an input from the user of user device 200. Then, prediction module 255 may predict the one or more items that are related with the input form the user and calculate a prediction value for each of the one or more items based on the at least one first prediction model.

In the course of predicting the one or more items and calculating the prediction value, prediction module 255 may also use preprocessed item data. The preprocessed item data may include an extracted feature vector for each modality of each item. For example, the preprocessed item data may include a feature vector for text of an item and a feature vector for images of the item. Prediction module 255 may calculate a distance value using the feature vector. Additionally or optionally, cache module 260 may be configured to store the preprocessed item data before display module 210 displays the first representation, in particular, before prediction module 255 predicts the one or more items based on the at least one first prediction module. In some examples, communication interface module 240 may receive the preprocessed item data from the server in order to reduce computational process of user device 200. In some other examples, process module 250 may preprocess the item data to obtain the preprocessed item data, for example, in the background. Process module 250 may preprocess the item data, for example, when user device 200 is in an idle state; when user device 200 is being charged; when a current time is within a time period set by the user; or during any application program is running. When user interface module 220 receives the input from the user, prediction module 255 may obtain the preprocessed item data from cache module 260 to predict the one or more items based on the at least one first prediction model.

Representation generation module 256 may prepare the first representation based on the prediction value for each of the one or more items. In some examples, additionally and/or alternatively, cache module 110 may store the first representation, which may have prepared in the background. Before display module 210 displays the first representation, prediction module 255 may predict the one or more items and calculate the prediction value for each of the one or more items, based on the at least one first prediction module, and representation generation module 256 may prepare the first representation, for example, in the background. Cache module 260 may store the prepared first representation with calculated prediction values for the one or more items. In such examples, when user interface module 220 receives the input from the user of user device 200, process module 250 may obtain the first representation from cache module 260 and display module 210 displays the first representation.

In some embodiments, user activity log data generation module 252 may detect an activity of the user to generate user activity log data. The activity of the user may be made by the user using user device 200 in response to displaying of the first representation and/or displaying of the at least one modality in the first representation. Such activity may be related to an item among the one or more items in the first representation and/or the at least one modality of the item. In an example, the user may select one of a plurality of buttons with regard to an item displayed on display module 210. For example, the user may select a "like" button, an "unlike" button or a "next" button for the displayed item, where selecting of the "like" button may correspond to a positive activity of the user for the displayed item, selecting of the "unlike" button may correspond to a negative activity of the user for the displayed item and selecting of the "next" button may not be related to the preference of the user. In another example, the user may select one of a plurality of buttons relating to a modality of the item. For example, the user may select a button for flipping multiple photos for the item or drag a cursor for going up and down a text portion for the item. In yet another example, the user may spend a time period while the user is looking at the modality of the item. The activity of the user to be detected by user activity log data generation module 252 is not limited to the above examples, and the other user activities with regard to the item or the modality of the item are applicable.

Evaluation module 253 may be configured to evaluate the at least one first prediction model based on the user activity log data to generate an evaluation value of the at least one first prediction model. In some examples, the generated evaluation value may be related to user activity for a modality. Evaluation module 243 may calculate, for example, an accuracy, a degree of precision, a recall value, a F1 score and the like of the prediction of the user activity.

Training module 254 may be configured to obtain at least one second prediction model based on the user activity log data.

In some embodiments, training module 254 may train the at least one first prediction model based on the user activity log data to generate the at least one second prediction model. Training module 254 may train the at least one first prediction model using the user activity log data and store the trained at least one first prediction model as the at least one second prediction model in memory module 230, while memory module 230 maintains the at least one first prediction model. In some examples, when user activity log data generation module 252 detects another activity of the user to generate another user activity log data, evaluation module 253 evaluates the at least one second prediction model based on the other user activity log data to generate a second evaluation value. When evaluation module 253 determines that the second evaluation value is below a predetermined value, evaluation module 253 may select the maintained at least one first prediction model, and training module 254 may train the selected at least one first prediction model based on the other user activity log data to generate at least one third prediction model. Otherwise, when evaluation module 253 determines that the second evaluation value is not below the predetermined value, training module 254 may train, based on the other user activity log data, the at least second prediction model to generate at least one third prediction model.

In other embodiments, evaluation module 253, in addition to evaluating the at least one first prediction model, may also be configured to evaluate at least one prediction model other than the at least one first prediction model. Further, evaluation module 253 may generate an evaluation value of the at least one other prediction model. In such examples, evaluation module 253 may determine at least one prediction model based on the respective evaluation values of the at least one first prediction model and the at least one other prediction model. For example, evaluation module 253 may compare the evaluation values of the at least one first prediction model and the at least one other prediction model to determine the at least one prediction model. Then, training module 254 may train the determined at least one prediction model based on the user activity log data to generate at least one second prediction model.

In yet other embodiments, when evaluation module 253 determines that the evaluation value of the at least one first prediction model is below a predetermined value, communication interface module 240 may transmit a request for a prediction model to the server and receive at least one other prediction model from the server. Then, memory module 230 may store the received at least one other prediction model as the at least one second prediction model for a next prediction.

In some additional embodiments, training control module 257 may be configured to control the operation of training module 254. In some examples, training control module 257 may cause training module 255 to initiate model training when a predetermined condition is met. By way of example, but not limitation, the predetermined condition to initiate the model training may include at least one of the following conditions: a) when the amount of the generated user activity log data is above or below a first predetermined value; b) when the generated evaluation value is above or below a second predetermined value; c) when user device 200 is in an idle state; d) when user device 200 is being charged; and e) when a current time is within a time period set by the user. In some examples, training control module 257 may cause training module user device 200 to stop the model training when a predetermined condition is met. By way of example, but not limitation, the predetermined condition to stop the model training may include at least one of the following conditions: a) when user device 200 is executing an operation that requires a CPU usage over a third predetermined value; and b) when user device 200 is executing an operation that requires special attention of the user, for example, an operation relating to on line sales or on line payment.

Representation generation module 256 may update the first representation based on the at least one second prediction model to generate a second representation of at least one modality of one or more items among the plurality of items. In some examples, prediction module 255 may predict one or more items among the plurality of items from the item data based on the at least one or more items, and representation generation module 256 may generate the second representation of the predicted one or more items. In some other examples, prediction module 255 may recalculate a prediction value for each of the one or more items of the first representation using the at least one second prediction model. Then, representation generation module 256 may adjust the arrangement of the first representation based on the calculated values to generate the second representation. By way of example, but not limitation, representation generation module 256 may sort the one or more items, filter some of the one or more items, change the position of modalities of an item, or any types of change in the representation.

In some examples, the at least one modality may include a plurality of modalities and the at least one first prediction model may include a plurality of first prediction models. Each of the plurality of first prediction models is related to each of the plurality of modalities. For example, the plurality of first prediction models may include at least two first prediction models, e.g., a first prediction model for text, a first prediction model for image, a first prediction model for the numeric, etc. In such examples, training module 254 may generate a plurality of second prediction models or communication interface module 240 may receive the plurality of second prediction models from the server. Evaluation module 253 may calculate weight values for the plurality of modalities of the plurality of first prediction models. Each of weight values may be related to user's relative preference of one modality to other modalities. Evaluation module 253 may calculate a weight value based on the evaluation value of each of the plurality of first prediction models and the user activity log data. For example, if a weight value of the first prediction model for text is higher than that of the first prediction model for image, the user may prefer reading the text than watching the image. Prediction module 255 may predict one or more items among the plurality of items and may calculate, for each of the predicted one or more items, prediction values of the plurality of modalities based on the plurality of second prediction models. Then, prediction module 255 may generate a combined prediction value for each of the predicted one or more items based on the calculated prediction values and weight values calculated by evaluation module 253. Representation generation module 256 may update, based on the combined prediction value for each of the predicted one or more items, the first representation to generate a second representation to be displayed on display module 210.

In an example, the plurality of modalities includes modality X (e.g., image) and modality Y (e.g., text). The plurality of first prediction model includes a first prediction model of modality X and a first prediction model of modality Y. The user activity log data generated by user activity log data generation module 252 includes user activity log data of modality X and user activity log data of modality Y.

In the above example, evaluation module 253 may evaluate the first prediction models of modality X and the modality Y, respectively based on the user activity log data of modality X and modality Y to generate an evaluation value of the first prediction model of modality X and an evaluation value of the first prediction model of the modality Y. Further, evaluation module 253 may calculate a weight value of modality X and a weight value of modality Y, respectively based on the evaluation values of the first prediction model of modality X and the first prediction model of modality Y and also respectively based on the user activity log data of modality X and modality Y. Training module 254 may train the first prediction models of the modality X and the modality Y, respectively based on the user activity log data of the modality X and the modality Y to generate a second prediction model of the modality X and a second prediction model of the modality Y. Prediction module 255 may predict one or more items among the plurality of items to be presented to the user based on the second prediction models of modality X and modality Y. Further, prediction module 255 may calculate, for each of the predicted one or more items, a prediction value of modality X and a prediction value of modality Y based on the second prediction models of modality X and modality Y. Then, prediction module 255 may generate a combined prediction value for each of the predicted one or more items based on the calculated prediction values of modality X and modality Y and the calculated weight values of modality X and modality Y. Representation generation module 256 may update, based on the combined prediction value for each of the predicted one or more items, the first representation to generate a second representation.

Figure 3A:
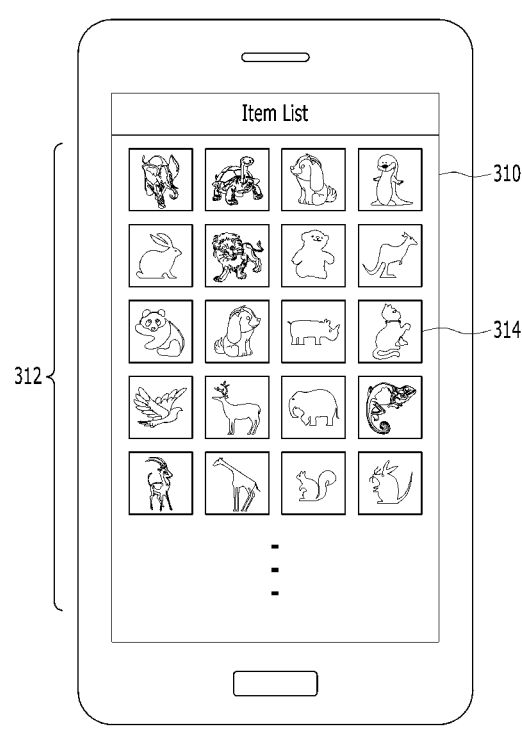
FIG. 3A shows an example representation including a plurality of items predicted based on at least one prediction model.
Figure 3B:
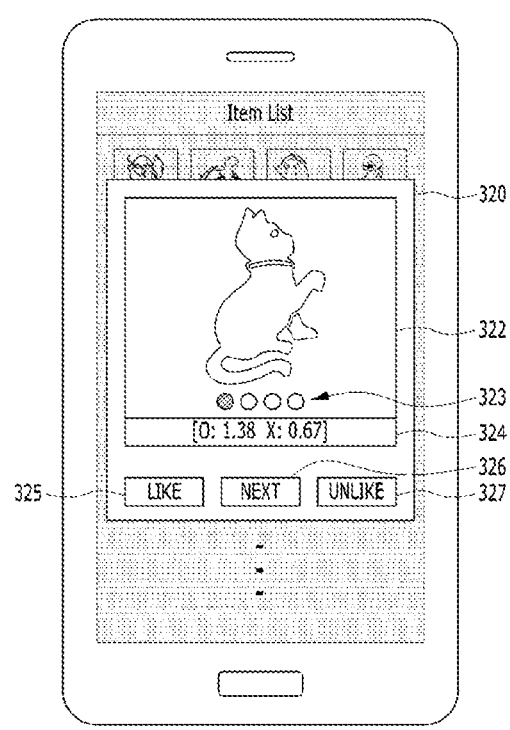
FIG. 3B shows an example representation with a single-modality content for an item selected by a user from the plurality of items as shown in FIG. 3A.
Figure 3C:
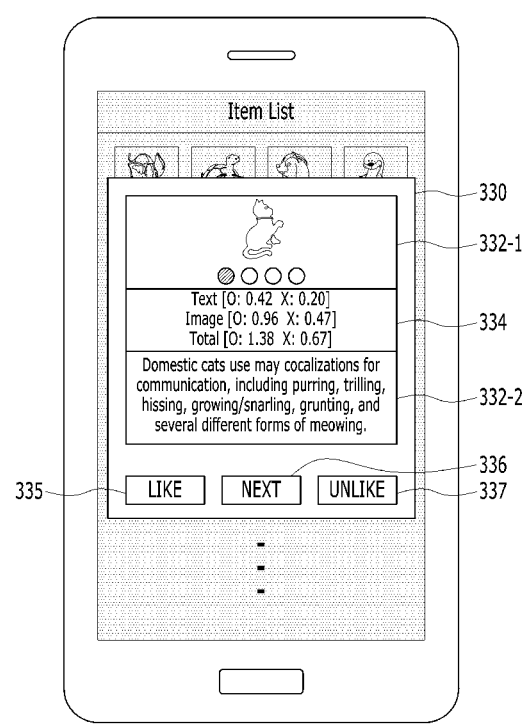
FIG. 3C shows another example representation with a multi-modality content for an item selected by a user from the plurality of items as shown in FIG. 3A, arranged in accordance with at least some embodiments described herein.

FIG. 3A shows an example representation including a plurality of items predicted based on at least one prediction model, FIG. 3B shows an example representation with a single-modality content for an item selected by a user from the plurality of items as shown in FIG. 3A, and FIG. 3C shows another example representation with a multi-modality content for an item selected by a user from the plurality of items as shown in FIG. 3A, arranged in accordance with at least some embodiments described herein. As depicted in FIG. 3A, a user device (such as, for example, user device 110 of FIG. 1 or user device 200 of FIG. 2) displays a representation 310. The user device may predict a plurality items based on the at least one prediction model. The user device may generate and display representation 310, for example, in response to receiving an input from the user. Representation 310 may include the plurality of predicted items 312. Arrangement of the plurality of predicted items 312 may be determined based on the at least one prediction model.

The user device may detect a user activity of the user to generate user activity log data. For example, the user may select an item 314 in representation 310. In response to receiving of the user selection of item 314, the user device may display a representation for item 314, such as a representation 320 shown in FIG. 3B or a representation 330 shown in FIG. 3C.

As depicted in FIG. 3B, representation 320 for item 314 may include a single-modality content, such as image 322. When displaying representation 320, the user device may detect an activity of the user to generate user activity log data. For example, the user may select one of buttons 323 for flipping multiple images 322, may select a "LIKE" button 325, may select a "NEXT" button 326, may select an "UNLIKE" button 327, or may spend a time period while the user Is looking at representation 320. The user device may calculate a prediction value 324 for item 314 based on the user activity log data. Although FIG. 3B shows that the user device displays a prediction value 324 in representation 320, in some embodiments, prediction value 324 may not be shown in representation 320.

As depicted in FIG. 3C, representation 330 for item 314 may include multi-modality content, such as image 332-1 and text 332-2. When displaying representation 330, the user device may detect an activity of the user to generate user activity log data. For example, the user may select one of buttons for flipping multiple images 332-1, may select a "LIKE" button 335, may select a "NEXT" button 336, may select a "UNLIKE" button 337, may spend a time period while the user Is looking at a portion of images 332-1 or text 332-2, may drag on a bar on a portion of text 332-2, or may drag a portion of images 332-1 or text 332-2. The user device may calculate a weight value for each of modalities (i.e., text and image), and may calculate a prediction value for each modality based on the weight value and the user activity log data. Although FIG. 3C shows that the user device displays a prediction value 334 in representation 330, in some embodiments, prediction value 334 may not be shown in representation 330.

Figure 4A:
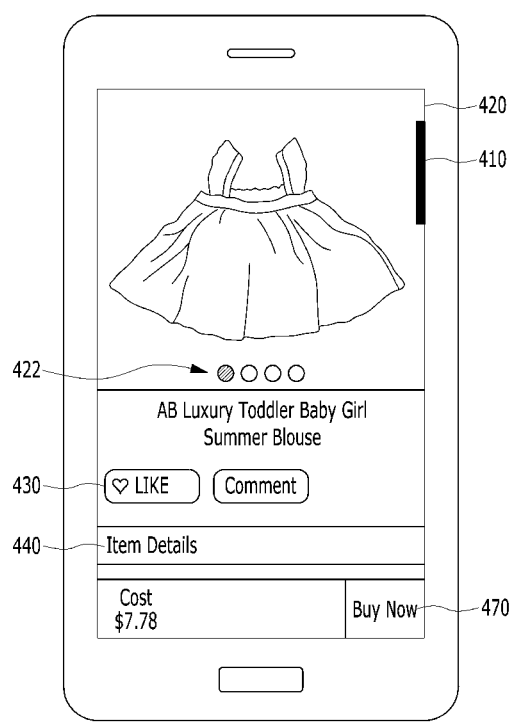
FIGS. 4A-4C show an example representation regarding on line sales displayed on a user device, arranged in accordance with at least some embodiments described herein.
Figure 4B:
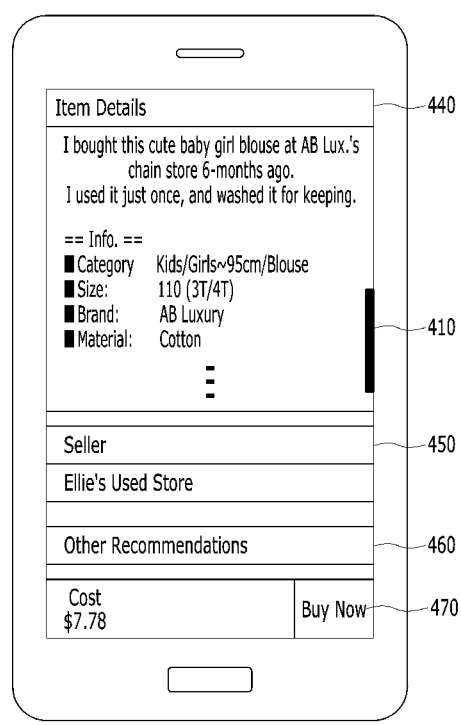
Figure 4C:
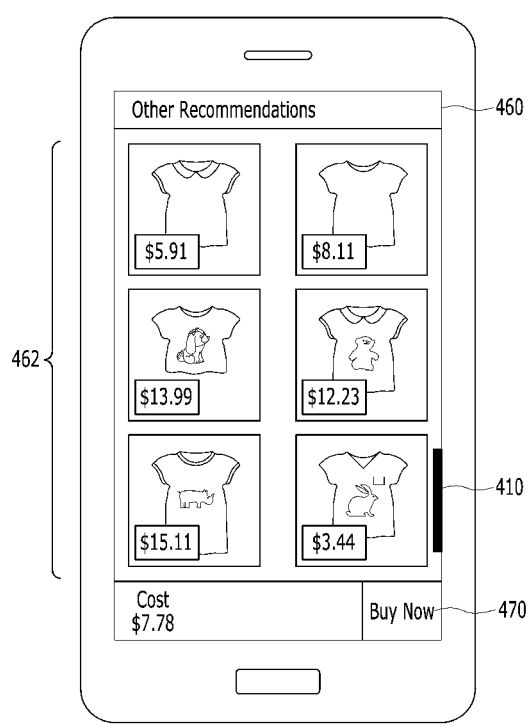

FIGS. 4A-4C show an example representation regarding on line sales displayed on a user device, arranged in accordance with at least some embodiments described herein. In this example, the user device (such as, for example, user device 110 of FIG. 1 or user device 200 of FIG. 2) may display a representation regarding on line sales for an item, a toddler girl blouse. FIG. 4A shows that the user device displays an upper portion of the representation, FIG. 4B shows that the user device displays a middle portion of the representation and FIG. 4C shows that the user device displays a lower portion of the representation. A user of the user device can scroll up and down using the user device to change a displayed portion of the representation, and the user device may display a bar 410 as shown in FIGS. 4A-4C to indicate a location of the displayed portion within the representation. In accordance with the present disclosure, when displaying the representation, the user device may detect a user activity of the user to generate user activity log data. Then, the user device may calculate a weight value for each of modalities (i.e., text and image) and may calculate a prediction value for each modality based on the weight value and the user activity log data.

As depicted in FIG. 4A, the user device may display the upper portion of the representation, while bar 410 is located in a position shown in FIG. 4A. In an example, the user may be interested in images of the item and thus, the user may spend a certain time period to watch images 420 and/or select one of buttons 422 for flipping images 420. In such an example, the user device may detect the time period that bar 410 stays around the position shown in FIG. 4A and/or the selections of the buttons 422 to generate the user activity log data which may indicate the user's positive activities for images. In another example, the user may select a "LIKE" button 430, and the user device may detect the selection of "LIKE" button 430 to generate the user activity data which may indicate the user's positive activities for the item itself. In yet another example, the user may select a "BUY NOW" button 470, and the user device may detect the selection of "BUY NOW" button 470 to generate the user activity log data which may indicate the user's positive activities for the item itself, and/or, to generate, based on the position of bar 410, the user activity log data which indicates the user's positive activities for images.

As depicted in FIG. 4B, the user device may display the middle portion of the representation, while bar 410 is located in a position shown in FIG. 4B. In an example, the user may be interested in item details 440 and/or a seller 450 of the item, both of which consist of text, and thus, the user may spend a certain time period to read item details 440 and/or to confirm seller 450. In such example, the user device may detect the time period that bar 410 stays around the position shown in FIG. 4B to generate the user activity log data which may indicate the user's positive activities for text. In another example, the user may select "BUY NOW" button 470, and the user device may detect the selection of "BUY NOW" button 470 to generate the user activity log data which may indicate the user's positive activities for the item itself, and/or, to generate, based on the position of bar 410, the user activity log data which may indicate the user's positive activities for text.

As depicted in FIG. 4C, the user device may display the lower portion of the representation, while bar 410 is located in a position shown in FIG. 4C. In an example, the user may be interested in other recommendations 460 including a plurality of images 462 of other items that are recommended to the user and thus, the user may spend a certain time period to watch images 462 and/or select one of items in images 462 to see more details of the selected one. In such an example, the user device may detect the time period that bar 410 stays around the position shown in FIG. 4C to generate the user activity log data which may indicate the user's positive activities for images. In another example, the user may select one of items in images 462, and the user device may detect the selection of item to generate the user activity data which may indicate the user's positive activities for the selected item in images 462. In yet another example, the user may select "BUY NOW" button 470, and the user device may detect the selection of "BUY NOW" button 470 to generate the user activity log data which may indicate the user's positive activities for the item itself.

Figure 5:
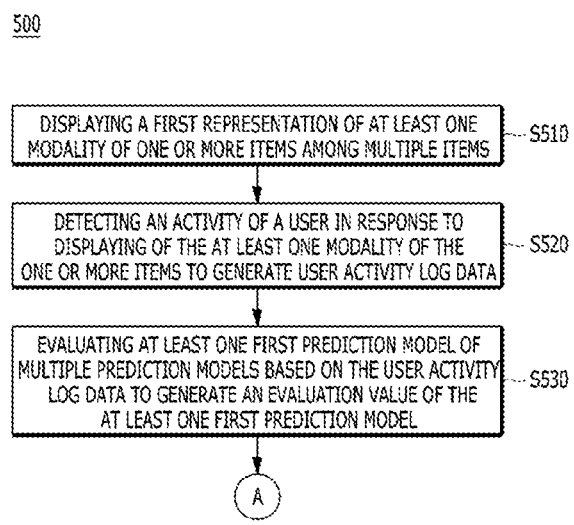
FIG. 5 illustrates an example flow diagram of a process for providing model training, arranged in accordance with at least some embodiments described herein.

FIG. 5 illustrates an example flow diagram of a process for providing model training, arranged in accordance with at least some embodiments described herein. A process 500 of FIG. 5 may be implemented using a computing device, such as, for example, user device 110 or 200 described with reference to FIG. 1 or 2, which may operatively communicate with server 130 described with reference to FIG. 1. Thus, the computing device may include a display module and a memory module. The memory module may be configured to store a plurality of prediction models and item data. The item data may include data of a plurality of items. Process 500 may include one or more operations, actions, or functions as illustrated by one or more of blocks S 510, S 520 and/or S 530. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 500 may begin at block S 510, "DISPLAYING A FIRST REPRESENTATION OF AT LEAST ONE MODALITY OF ONE OR MORE ITEMS AMONG MULTIPLE ITEMS."

At block S 510, the computing device may display a first representation on the display module. In some examples, the computing device may predict one or more items among the plurality items based on the at least one first prediction model and may generate a first representation for the predicted one or more items. The first representation may include at least one modality of the one or more items. Block S 510 may be followed by block S 520, "DETECTING AN ACTIVITY OF A USER IN RESPONSE TO DISPLAYING OF THE AT LEAST ONE MODALITY OF THE ONE OR MORE ITEMS TO GENERATE USER ACTIVITY LOG DATA."

At block S 520, the computing device may detect an activity of the user to generate user activity log data. The activity of the user may be made by the user using the computing device in response to displaying of the first representation and/or displaying of the at least one modality in the first representation. Such activity may be related to an item among the one or more items in the first representation and/or the at least one modality of the item. The user activity log data may include data relating to at least one of a user's choice on a plurality of buttons with regard to a modality of an item that are displayed on the display module, a time period while the user is looking at the modality of the item and any other user's activities with regard to the modality of the item. Block S 520 may be followed by block S 530, "EVALUATING AT LEAST ONE FIRST PREDICTION MODEL OF MULTIPLE PREDICTION MODELS BASED ON THE USER ACTIVITY LOG DATA TO GENERATE AN EVALUATION VALUE OF THE AT LEAST ONE FIRST PREDICTION MODEL."

At block S 530, the computing device may evaluate the at least one first prediction model based on the user activity log data to generate an evaluation value of the at least one first prediction model. The generated evaluation value may be related to a user activity for a modality. The evaluation value may include, for example, an accuracy, a degree of precision, a recall value, a F1 score and the like of the prediction of the user activity.

Figure 6:
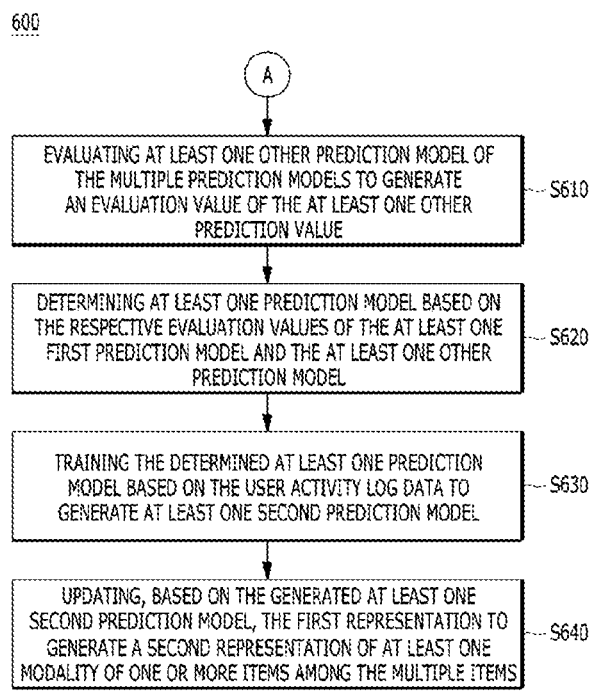
FIG. 6 illustrates an example flow diagram of a further process for providing model training, arranged in accordance with at least some embodiments described herein.

FIG. 6 illustrates an example flow diagram of a further process for providing model training, arranged in accordance with at least some embodiments described herein. A process 600 may be implemented using a computing device, such as, for example, user device 110 or 200 described with reference to FIG. 1 or 2, which may operatively communicate with server 130 described with reference to FIG. 1. Process 600 may be carried out after process 500 as illustrated in FIG. 5.

Process 600 may include one or more operations, actions, or functions as illustrated by one or more of blocks S 610, S 620, S 630 and/or S 640. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 600 may begin at block S 610, "EVALUATING AT LEAST ONE OTHER PREDICTION MODEL OF THE MULTIPLE PREDICTION MODELS TO GENERATE AN EVALUATION VALUE OF THE AT LEAST ONE OTHER PREDICTION VALUE."

At block S 610, the computing device may evaluate at least one prediction value other than the at least one first prediction model as illustrated in process 500. The computing device may generate an evaluation value of the at least one other prediction model. Block S 610 may be included in Block S 530 of process S 50 0. That is, block S 610 may be carried out after or parallel to block S 530. Block S 610 may be followed by block S 620, "DETERMINING AT LEAST ONE PREDICTION MODEL BASED ON THE RESPECTIVE EVALUATION VALUES OF THE AT LEAST ONE FIRST PREDICTION MODEL AND THE AT LEAST ONE OTHER PREDICTION MODEL."

At block S620, the computing device may determine at least one prediction model based on the evaluation value of the at least one first prediction model generated at block S530 of process 500 and the evaluation value of the at least one other prediction model generated at block S610. For example, the computing device may compare the evaluation values of the at least one first prediction model and the at least one other prediction model to determine the at least one prediction model with a higher evaluation value. Block S620 may be followed by block S630, "TRAINING THE DETERMINED AT LEAST ONE PREDICTION MODEL BASED ON THE USER ACTIVITY LOG DATA TO GENERATE AT LEAST ONE SECOND PREDICTION MODEL."

At block S630, the computing device may train the at least one prediction model determined at block S620 based on the user activity log data generated at block S520 to generate at least one second prediction model. In some examples that the at least one modality includes a plurality of modalities and thus the at least one first prediction model includes a plurality of first prediction models, the computing device may calculate weight values for the plurality of modalities of the plurality of first prediction models and then, may generate the at least one second prediction model. Block S630 may be followed by block S640, "UPDATING, BASED ON THE GENERATED AT LEAST ONE SECOND PREDICTION MODEL, THE FIRST REPRESENTATION TO GENERATE A SECOND REPRESENTATION OF AT LEAST ONE MODALITY OF ONE OR MORE ITEMS AMONG THE MULTIPLE ITEMS."

At block S640, the computing device may update the first representation based on the generated at least one second prediction model. In some examples, the computing device may predict one or more items among the plurality of items in the item data based on the at least one second prediction model and may generate the second representation of the predicted one or more items. In some other examples, the computing device may calculate a prediction value for each of the one or more items using the at least one second prediction model and may adjust the arrangement of the first representation based on the calculated prediction values to generate the second representation. In some examples that the at least one modality includes a plurality of modalities, the computing device may generate a combined prediction value for each of the predicted one or more items based on the calculated prediction values of multiple modalities and the weight values.

Figure 7:
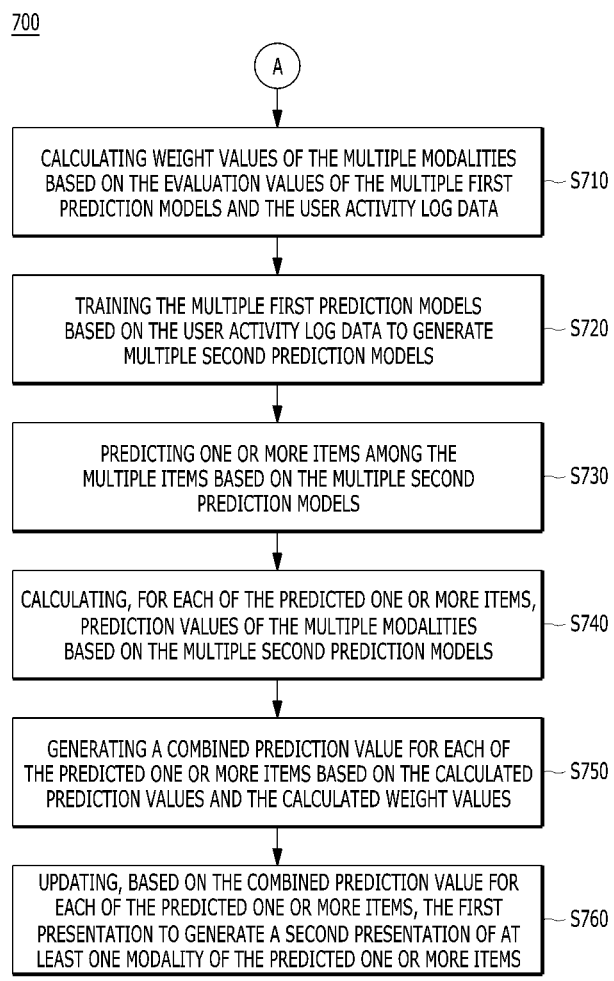
FIG. 7 illustrates an example flow diagram of another further process for providing model training, arranged in accordance with at least some embodiments described herein.

FIG. 7 illustrates an example flow diagram of another further process for providing model training, arranged in accordance with at least some embodiments described herein. A process 700 may be implemented using a computing device, such as, for example, user device 110 or 200 described with reference to FIG. 1 or 2, which may operatively communicate with server 130 described with reference to FIG. 1. Process 700 may be carried out after process 500 as illustrated in FIG. 5.

Process 700 may include one or more operations, actions, or functions as illustrated by one or more of blocks S710, S720, S730, S740, S750 and/or S760. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. At process 700, the at least one modality may include multiple modalities and the at least one first prediction model may include multiple first prediction models. Process 700 may begin at block S710, "CALCULATING WEIGHT VALUES OF THE MULTIPLE MODALITIES BASED ON THE EVALUATION VALUES OF THE MULTIPLE FIRST PREDICTION MODELS AND THE USER ACTIVITY LOG DATA."

At block S710, the computing device may calculate weight values for the multiple modalities of the multiple first prediction models. Each of the multiple first prediction models is related to each of the multiple modalities. For example, the multiple first prediction models may include at least two first prediction models, e.g., a first prediction model for text, a first prediction model for image, a first prediction model for the numeric, etc. Each of weight values may be related to user's relative preference of one modality to other modalities and may be calculated based on the evaluation value of each of the multiple first prediction models and the user activity log data. For example, if a weight value of the first prediction model for text is higher than that of the first prediction model for image, that means the user prefers reading the text than watching the image. Block S710 may be followed by block S720, "TRAINING THE MULTIPLE FIRST PREDICTION MODELS BASED ON THE USER ACTIVITY LOG DATA TO GENERATE MULTIPLE SECOND PREDICTION MODELS."

At block S720, the computing device trains the multiple first prediction models based on the user activity log data generated at block S520 of process 500. In some examples, the computing device may train the first prediction models for the respective modalities based on the user activity log data to generate the second prediction models for the respective modalities. Block S720 may be followed by block S730, "PREDICTING ONE OR MORE ITEMS AMONG THE MULTIPLE ITEMS BASED ON THE MULTIPLE SECOND PREDICTION MODELS."

At block S730, the computing device may predict one or more items among the plurality of items included in the item data based on the multiple second prediction models generated at block S720. Block S730 may be followed by S740, "CALCULATING, FOR EACH OF THE PREDICTED ONE OR MORE ITEMS, PREDICTION VALUES OF THE MULTIPLE MODALITIES BASED ON THE MULTIPLE SECOND PREDICTION MODELS."

At block S740, the computing device may calculate prediction values of the multiple modalities based on the multiple second prediction models generated at block S720. The prediction values may be calculated for each of the one or more items predicated at blocks S730. Further, the prediction values may be calculated for each of the multiple modalities. Block S740 may be followed by block S750, "GENERATING A COMBINED PREDICTION VALUE FOR EACH OF THE PREDICTED ONE OR MORE ITEMS BASED ON THE CALCULATED PREDICTION VALUES AND THE CALCULATED WEIGHT VALUES."

At block S750, the computing device may generate a combined prediction value for each of the one or more items predicted at block S730 based on the prediction values calculated at block S740 and the weight values calculated at block S710. Block S750 may be followed by block S760, "UPDATING, BASED ON THE COMBINED PREDICTION VALUE FOR EACH OF THE PREDICTED ONE OR MORE ITEMS, THE FIRST PRESENTATION TO GENERATE A SECOND PRESENTATION OF AT LEAST ONE MODALITY OF THE PREDICTED ONE OR MORE ITEMS."

At block S760, the computing device may update, based on the combined prediction value generated at block S750 for each of the predicted one or more items, the first representation to generate a second representation. In some examples, the computing device may calculate a prediction value for each of the one or more items using the at least one second prediction model and may adjust the arrangement of the first representation based on the combined prediction value to generate the second representation.

FIG. 8 illustrates an example flow diagram of another process for providing model training, arranged in accordance with at least some embodiments described herein. A process 800 may be implemented using a computing device, such as, for example, user device 110 or 200 described with reference to FIG. 1 or 2, which may operatively communicate with server 130 described with reference to FIG. 1. Process 800 may include one or more operations, actions, or functions as illustrated by one or more of blocks S810, S820, S830 and/or S840. Each of blocks S810, S820 and S830 corresponds to one example of each of blocks S510, S520 and S530 of FIG. 5 that the at least one modality in the first representation includes modality X and modality Y. Further, block S840 corresponds to one example of block S710 of FIG. 7 that the multiple modalities in the first representation include modality X and modality Y. In this regard, the detailed descriptions of blocks S510, S520, S530 and S710 can be used for blocks S810, S820, S830 and S840, respectively, and thus repetitive descriptions are omitted for simplicity and clarity.

In some further embodiments, process 800 may also include one or more operations, actions, or functions as illustrated by one or more of blocks S850, S860, S870, S880 and/or S890. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Each of blocks S850, S860, S870, S880 and S890 corresponds to one example of each of blocks S720, S730, S740, S750 and S760 of FIG. 7 that the multiple modalities in the first representation include modality X and modality Y. In this regard, the detailed descriptions of blocks S720, S730, S740, S750 and S760 can be also used for blocks S850, S860, S870, S880 and S890, respectively, and thus repetitive descriptions are omitted for simplicity and clarity.

In some other embodiments, one or more operations, actions, or functions as illustrated by blocks S510, S520, S530 and S540 in case where the at least one modality in the first representation includes modality X and modality Y can be substituted for blocks S850, S860, S870, S880 and/or S890.

FIG. 9A shows an example table including user interest values and prediction values for respective items and modalities and FIGS. 9B and 9C show example tables including evaluation values and weight values of respective models regarding each modality, arranged in accordance with at least some embodiments described herein.

The example values of FIGS. 9A are based on a second prediction model ("model 2") of each modality (i.e., image and text). That is, the items in the column of "Item_id" (i.e., m1111, m2222, m3333, m4444, . . . ) are predicted and selected based on the second prediction models for image and text. Further, the values in the column of "Img_pred_model 2" correspond to prediction values generated based on the second prediction model for image, where each of the prediction values indicates whether a user would be interested in image of a corresponding item, and the values in the column of "Text_pred_model 2" correspond to prediction values generated based on the second prediction model for text, where each of the prediction values indicates whether the user would be interested in text of a corresponding item. The above prediction values may be calculated by a user device as described with reference to FIGS. 1-3.

The user device may detect an activity of the user to generate user activity log data as described with reference to FIGS. 1-3. As shown in FIG. 9A, based on the user activity log data, the user device may determines the user interest values for image (the column of "Image_Interest") and the user interest values for text (the column of "Text_Interest") with regard to the items of m1111, m2222, m3333, m4444, . . . . For example, the user device may analyze the user activity log data with regard to m1111 and, as a result of the analysis, determine that the user is not interested in both image and text. In that case, the user interest values for image and text become 0. The user device may analyze the user activity log data with regard to item m2222 and, as a result of the analysis, determine that the user is not interested in image but is interested in text, and thus the user interest value for image becomes 0 and the user interest value text becomes 1. The user device may analyze the user activity log data with regard to item m3333 and, as a result of the analysis, determine that the user is interested in image but is not interested in text, and thus the user interest value for image becomes 1 and the user interest value for text becomes 0. The user device may analyze the user activity log data with regard to item m4444. As a result of the analysis, the user device may determine that the user is interested in image but cannot determine whether or not the user is interested in text. In such case, the user interest value for image becomes 1 and the user interest value for text becomes "Null."

Further, the user device may calculate interest rates for respective modalities, i.e., image and text, respectively. In an example, the interest rates may be obtained by averaging the interest values. As indicated in the interest value for text with regard to item m4444, when the interest value is "Null," the user device may exclude that null value in calculating the interest rate.

As depicted in FIGS. 9B and 9C, the user device may calculate an evaluation value and a weight value for each modality, i.e., image and text. In some examples, the user device may calculate an evaluation value for each model (e.g., a first prediction model, a second prediction model, etc.) and each modality (e.g., image, text, etc.) by comparing the prediction values and the user interest values shown in FIG. 9A.

In the table of FIG. 9B, for each of the first prediction model for image (Image_model 1) and the second prediction model for image (Image_model 2), respective evaluation values and weight values are shown. In some examples, the user device may calculate the evaluation value as an accuracy of prediction. For example, as shown in FIG. 9B, the accuracy of prediction based on the second prediction model for image is 100 percent (i.e., the evaluation value of 1.0 in FIG. 9B), while the accuracy of prediction based on the first prediction model for image is 70 percent (i.e., the evaluation value of 0.7 in FIG. 9B). Further, the weight value can be obtained by multiplying the evaluation value by the interest rate shown in FIG. 9A. For example, as shown in FIG. 9B, the weight value for image based on the second prediction model for image (i.e., 0.5) is obtained by multiplying the evaluation value of 1.0 by the interest rate for image of 0.50. Likewise, in the table of FIG. 9C, the evaluation value based on the second prediction model for text is 0.6 and the weight value for text based on the second prediction model for text (i.e., 0.198) is obtained by multiplying the evaluation value of 0.6 by the interest rate for text of 0.33. However, it should be understood by those skilled in the art that the present disclosure is not limited to the above described examples and other implementations for generating evaluation values, weight values and prediction values are also possible.

In some examples, the evaluation values may be used to determine the at least one prediction model as described, for example, in block S620 of process 600 of FIG. 6. Further, the weight values may be used to determine the combined prediction value as described, for example, in block S750 of process 700 of FIG. 7.

Figure 10:
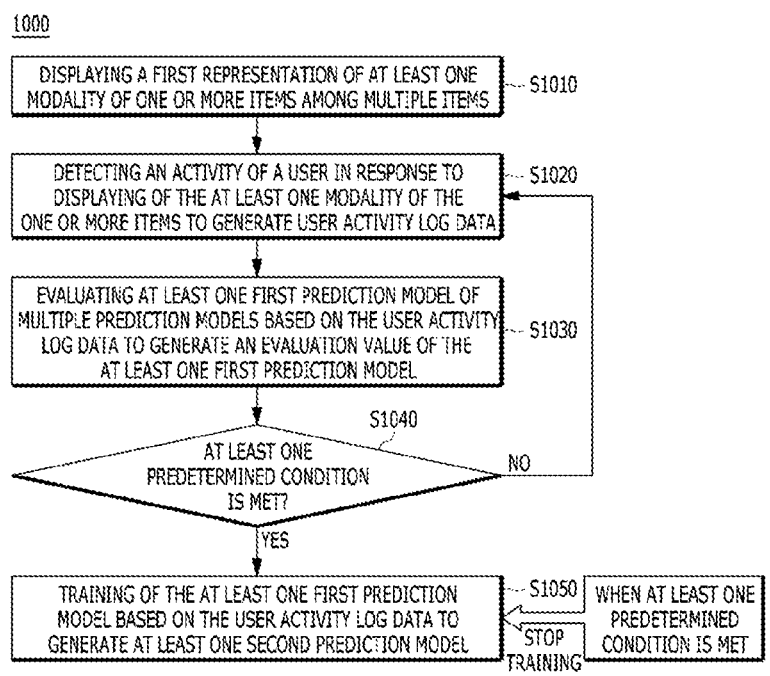
FIG. 10 illustrates an example flow diagram of a process for providing model training, arranged in accordance with at least some embodiments described herein.

FIG. 10 illustrates an example flow diagram of a process for providing model training, arranged in accordance with at least some embodiments described herein. A process 1000 may be implemented using a computing device, such as, for example, user device 110 or 200 described with reference to FIG. 1 or 2, which may operatively communicate with server 130 described with reference to FIG. 1. Process 1000 may include one or more operations, actions, or functions as illustrated by one or more of blocks S1010, S1020, S1030, S1040 and/or S1050. Since the detailed descriptions of blocks S510, S520 and S530 can be applicable to Blocks S1010, S1020 and S1030, respectively, and thus repetitive descriptions are omitted for simplicity and clarity. Block S1030, "EVALUATING AT LEAST ONE FIRST PREDICTION MODEL OF MULTIPLE PREDICTION MODELS BASED ON THE USER ACTIVITY LOG DATA TO GENERATE AN EVALUATION VALUE OF THE AT LEAST ONE FIRST PREDICTION MODEL" may be followed by block S1040, "AT LEAST ONE PREDETERMINED CONDITION IS MET?"

At block S1040, the computing device may determine whether at least one predetermined condition is met. The at least one predetermined condition is related to initiate training of the at least one first prediction model. The at least one predetermined condition to initiate the training may include at least one of a) when the amount of the generated user activity log data is above a first predetermined value; b) when the generated evaluation value is above a second predetermined value; c) when user device 110 is in an idle state; d) when user device 110 is being charged; and e) when a current time is within a time period set by the user. When the computing device determines that the at least one predetermined condition is met, block S1040 may be followed by block S1050, "TRAINING OF THE AT LEAST ONE FIRST PREDICTION MODEL BASED ON THE USER ACTIVITY LOG DATA TO GENERATE AT LEAST ONE SECOND PREDICTION MODEL." Otherwise, block S1040 may be followed by block S1020, "DETECTING AN ACTIVITY OF A USER IN RESPONSE TO DISPLAYING OF THE AT LEAST ONE MODALITY OF THE ONE OR MORE ITEMS TO GENERATE USER ACTIVITY LOG DATA."

At block S1050, the computing device may train the at least one prediction model based on the user activity log data generated at block S1020 to generate at least one second prediction model. In some examples, during the training, the computing device may determine whether at least one predetermined condition to stop the training is met. The at least one predetermined condition to stop the training includes at least one of a) when user device 110 is executing an operation that requires a CPU usage over a third predetermined value; and b) when user device 110 is executing an operation that relates to on line sales or on line payment.

Figure 11:
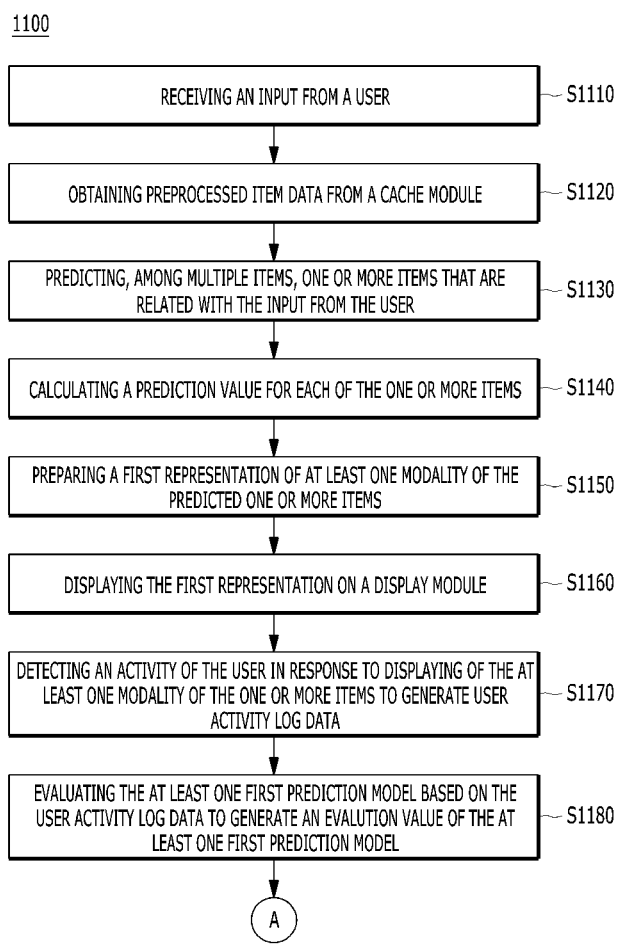
FIG. 11 illustrates an example flow diagram of yet another process for providing model training, arranged in accordance with at least some embodiments described herein.

FIG. 11 illustrates an example flow diagram of yet another process for providing model training, arranged in accordance with at least some embodiments described herein. A process 1100 may be implemented using a computing device, such as, for example, user device 110 or 200 described with reference to FIG. 1 or 2, which may operatively communicate with server 130 described with reference to FIG. 1. Thus, the computing device may include a display module and a memory module. The memory module is configured to store a plurality of prediction models and item data. Process 1100 may include one or more operations, actions, or functions as illustrated by one or more of blocks S1110, S1120, S1130, S1140, S1150, S1160, S1170 and/or S1180. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof.

Before beginning process 1100, the computing device may store preprocessed item data in its cache module. Such preprocessed item data may be received from the server or generated by the computing device in the background. For example, the preprocessed item data may include a feature vector for each modality of each item. Process 1100 may begin at block S1110, "RECEIVING AN INPUT FROM A USER." At block S1110, the computing device may receive an input from the user of the computing device. The input may be related to searching for one or more items. Block S1110 may be followed by block S1120, "OBTAINING PREPROCESSED ITEM DATA FROM A CACHE MODULE."

At block S1120, the computing device may obtain the preprocessed item data from the cache module. Block S1120 may be followed by block S1130, "PREDICTING, AMONG MULTIPLE ITEMS, ONE OR MORE ITEMS THAT ARE RELATED WITH THE INPUT FROM THE USER."

At block S1130, the computing device may predict one or more items that are related with the input from the user received at block S1110 using at least one first prediction model among the plurality of prediction models. The computing device may predict the one or more items using the preprocessed item data obtained at block S1120. Block S1130 may be followed by block S1140, "CALCULATING A PREDICTION VALUE FOR EACH OF THE ONE OR MORE ITEMS."

At block S1140, the computing device may calculate a prediction value for each of the one or more items predicted at block S1130. The prediction value is calculated based on the at least one first prediction model. Block S1140 may be followed by block S1150, "PREPARING A FIRST REPRESENTATION OF AT LEAST ONE MODALITY OF THE PREDICTED ONE OR MORE ITEMS."

At block S1150, the computing device may prepare a first representation of at least one modality of the one or more items predicted at block S1130. Further, the computing device may prepare the first representation based on the prediction value calculated at block S1140. Block S1150 may be followed by block S1160, "DISPLAYING THE FIRST REPRESENTATION ON A DISPLAY MODULE." Since the detailed descriptions of blocks S510, S520 and S530 can be applicable to Blocks S1160, S1170 and S1180, respectively, and thus repetitive descriptions are omitted for simplicity and clarity.

Figure 12:
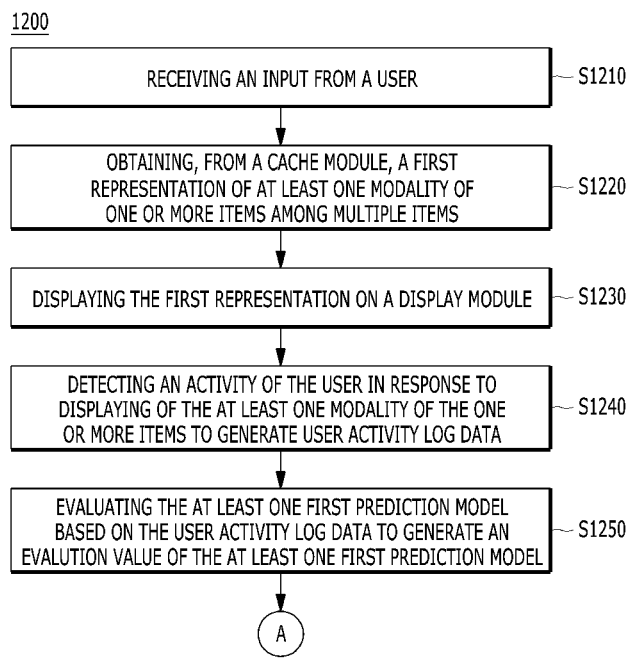
FIG. 12 illustrates an example flow diagram of yet another process for providing model training, arranged in accordance with at least some embodiments described herein.

FIG. 12 illustrates an example flow diagram of yet another process for providing model training, arranged in accordance with at least some embodiments described herein. A process 1200 may be implemented using a computing device, such as, for example, user device 110 or 200 described with reference to FIG. 1 or 2, which may operatively communicate with server 130 described with reference to FIG. 1. Thus, the computing device may include a display module and a memory module. The memory module is configured to store a plurality of prediction models and item data. Process 1200 may include one or more operations, actions, or functions as illustrated by one or more of blocks S1210, S1220, S1230, S1240 and/or S1250. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof.

Before beginning process 1200, the computing device may store a first representation in the cache module. The computing device may prepare the first representation when a predetermined condition is met, for example, in the background. Process 1200 may begin at block S1210, "RECEIVING AN INPUT FROM A USER."

At block S1210, the computing device may receive an input from the user of the computing device. The input may be related to searching for one or more items. Block S1210 may be followed by block S1220, "OBTAINING, FROM A CACHE MODULE, A FIRST REPRESENTATION OF AT LEAST ONE MODALITY OF ONE OR MORE ITEMS AMONG MULTIPLE ITEMS."

At block S1220, the computing device may obtain the first representation from the cache module. Block S1220 may be followed by block S1230, "DISPLAYING THE FIRST REPRESENTATION ON A DISPLAY MODULE." Since the detailed descriptions of blocks S510, S520 and S530 can be applicable to Blocks S1230, S1240 and S1250, respectively, and thus repetitive descriptions are omitted for simplicity and clarity.

FIGS. 13A and 13B show example cache tables of feature vector cache and FIGS. 13C and 13D show example cache tables of prediction cache, arranged in accordance with at least some embodiments described herein. As depicted in FIGS. 13A-13D, cache tables may be stored in a cache module of a user device (such as, for example, cache module 260 of user device 200 in FIG. 2). The cache table of feature vector cache shown in FIG. 13A may be related to image. The cache table of feature vector cache shown in FIG. 13C may be related to text. The cache table of prediction cache shown in FIG. 13B may be related to image. The cache table of prediction cache shown in FIG. 13D may be related to text. The feature vector cache of image and the feature vector cache of text are examples of preprocessed item data explained in the above. The prediction cache of image and prediction cache of text are examples of the first representation stored in the cache module explained in the above.

Figure 14:
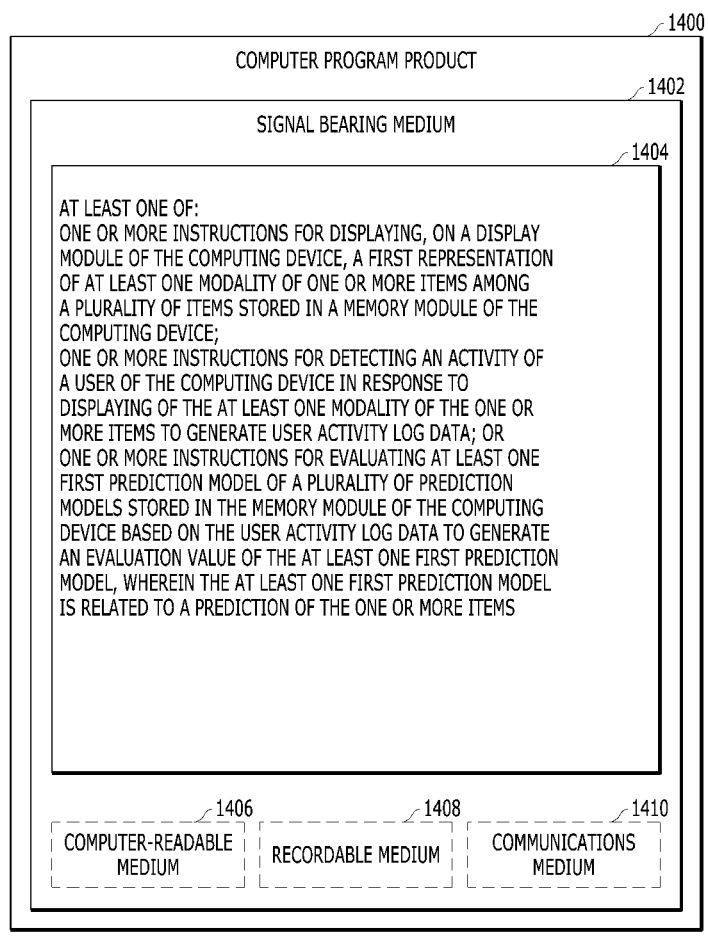
FIG. 14 illustrates a computer program product that can be utilized to provide model training, in accordance with at least some embodiments described herein.

FIG. 14 illustrates a computer program product 1400 that can be utilized to provide model training, in accordance with at least some embodiments described herein. Computer program product 1400 may include a signal bearing medium 1402. Signal bearing medium 1402 may include one or more instructions 1404 that, in response to execution by, for example, one or more processors, may provide the functionality and features described above with respect to FIGS. 1-13. By way of example, instructions 1404 may include at least one of: one or more instructions for one or more instructions for displaying, on a display module of the computing device, a first representation of at least one modality of one or more items among a plurality of items stored in a memory module of the computing device; one or more instructions for detecting an activity of a user of the computing device in response to displaying of the at least one modality of the one or more items to generate user activity log data; or one or more instructions for evaluating at least one first prediction model of a plurality of prediction models stored in the memory module of the computing device based on the user activity log data to generate an evaluation value of the at least one first prediction model, wherein the at least one first prediction model is related to a prediction of the one or more items. Thus, for example, referring to FIGS. 1-2, user device 110 or 200 may undertake one or more of the blocks shown in FIGS. 4-7 and 10-12, in response to instructions 1404.

In some implementations, signal bearing medium 1402 may encompass a non-transitory computer-readable medium 1406, such as, but not limited to, a hard disk drive, a Compact Disc (CD), a Digital Video Disk (DVD), a digital tape, memory, etc. In some implementations, signal bearing medium 1402 may encompass a recordable medium 1408, such as, but not limited to, memory, read/write (R/W) CDs, R/W DVDs, etc. In some implementations, signal bearing medium 1402 may encompass a communications medium 1410, such as, but not limited to, a digital and/or an analog communication medium (e.g., a fiber optic cable, a waveguide, a wired communications link, a wireless communication link, etc.). Thus, for example, program product 1400 may be conveyed to one or more modules of a computing device such as for example, user device 110 or 200 by an RF signal bearing medium 1402, where the signal bearing medium 1402 is conveyed by a wireless communications medium 1410 (e.g., a wireless communications medium conforming with the IEEE 802.11 standard).

Figure 15:
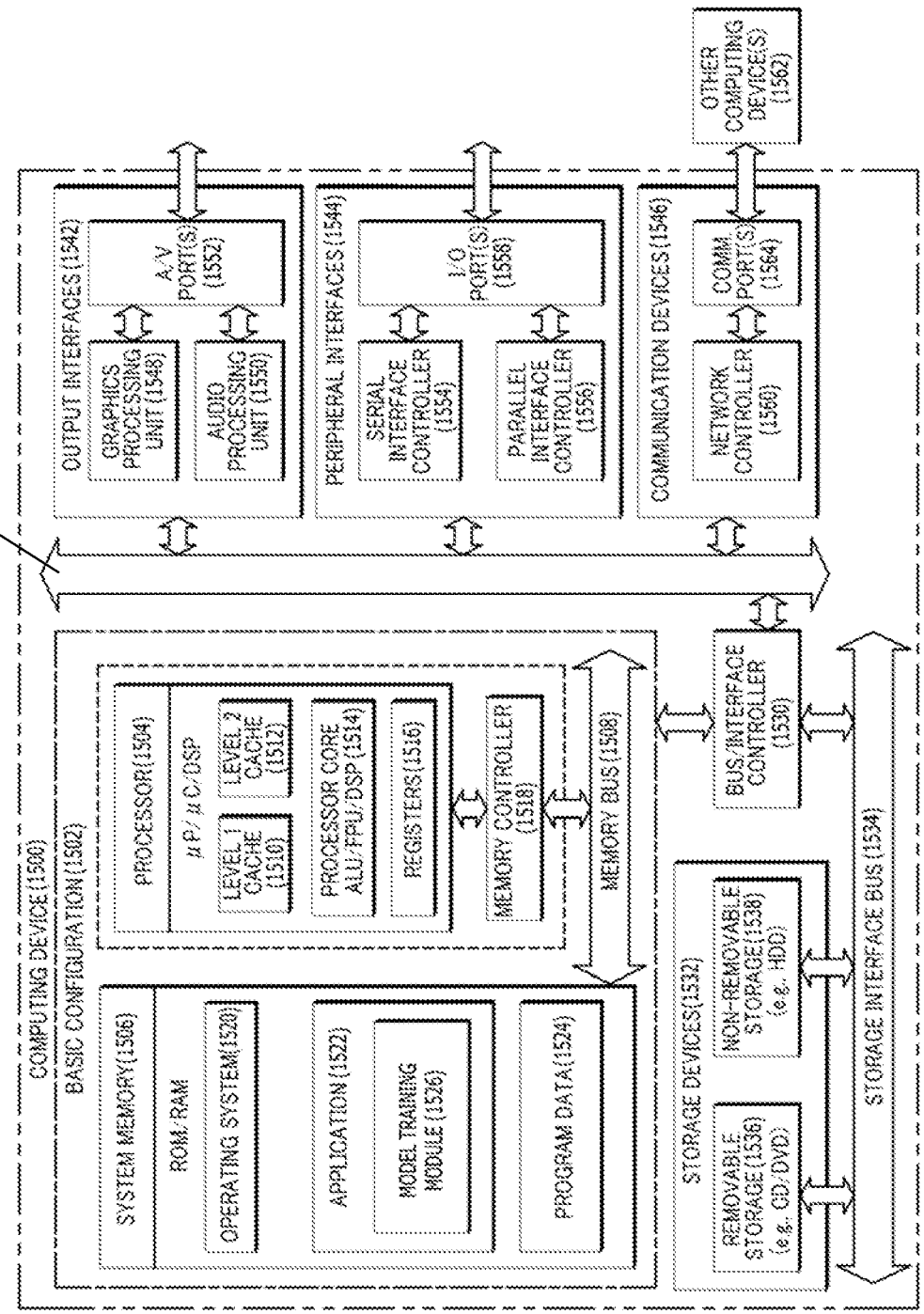
FIG. 15 is a block diagram illustrating an example computing device that can be configured for model training, arranged in accordance with at least some embodiments described herein.

FIG. 15 is a block diagram illustrating an example computing device that can be configured for model training, arranged in accordance with at least some embodiments described herein.

In a very basic configuration 1502, computing device 1500 typically includes one or more processors 1504 and a system memory 1506. A memory bus 1508 may be used for communicating between processor 1504 and system memory 1506.

Depending on the desired configuration, processor 1504 may be of any type including but not limited to a microprocessor (µP), a microcontroller (µC), a digital signal processor (DSP), or any combination thereof. Processor 1504 may include one or more levels of caching, such as a level one cache 1510 and a level two cache 1512, a processor core 1514, and registers 1516. An example processor core 1514 may include an arithmetic logic unit (ALU), a floating point unit (FPU), a digital signal processing core (DSP Core), or any combination thereof. An example memory controller 1518 may also be used with processor 1504, or in some implementations memory controller 918 may be an internal part of processor 1504.

Depending on the desired configuration, system memory 1506 may be of any type including but not limited to volatile memory (such as RAM), non-volatile memory (such as ROM, flash memory, etc.) or any combination thereof. System memory 1506 may include an operating system 1520, one or more applications 1522, and program data 1524.

Application 1522 may include an model training module 1526 that may be arranged to perform the operations and/or functions as described herein including the actions described with respect to architectures of user device 110 or 200 as shown in FIGS. 1 and 2 or including the actions described with respect to the flow chart shown in FIGS. 4-7 and 10-12. Program data 1524 may include any data that may be useful for providing the prediction model training scheme as is described herein. In some examples, application 1522 may be arranged to operate with program data 1524 on an operating system 1520 such that the prediction model training scheme as described herein may be provided.

Computing device 1500 may have additional features or functionality, and additional interfaces to facilitate communications between basic configuration 1502 and any required devices and interfaces. For example, a bus/interface controller 1530 may be used to facilitate communications between basic configuration 1502 and one or more data storage devices 1532 via a storage interface bus 1534. Data storage devices 1532 may be removable storage devices 1536, non-removable storage devices 1538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1506, removable storage devices 1536 and non-removable storage devices 1538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1500. Any such computer storage media may be part of computing device 1500.

Computing device 1500 may also include an interface bus 1540 for facilitating communication from various interface devices (e.g., output devices 1542, peripheral interfaces 1544, and communication devices 1546) to basic configuration 1502 via bus/interface controller 1530. Example output devices 1542 include a graphics processing unit 1548 and an audio processing unit 1550, which may be configured to communicate to various external devices such as a display or speakers via one or more A/V ports 1552. Example peripheral interfaces 1544 include a serial interface controller 1554 or a parallel interface controller 1556, which may be configured to communicate with external devices such as input devices (e.g., keyboard, mouse, pen, voice input device, touch input device, etc.) or other peripheral devices (e.g., printer, scanner, etc.) via one or more I/O ports 1558. An example communication device 1546 includes a network controller 1560, which may be arranged to facilitate communications with one or more other computing devices 1562 over a network communication link via one or more communication ports 1564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method performed on a computing device including a display module and a memory module, wherein the memory module is configured to store a plurality of prediction models and item data that includes data of a plurality of items, the method comprising:
    displaying, on the display module, a first representation of at least one modality of one or more items among the plurality of items;
    detecting an activity of a user of the computing device in response to displaying of the at least one modality of the one or more items to generate user activity log data;
    evaluating, at the computing device, at least two prediction models of the plurality of prediction models to generate respective evaluation values of the at least two prediction models;
    selecting, at the computing device, at least one first prediction model of the plurality of prediction models based on the user activity log data by generating at least one evaluation value of the at least one first prediction model, wherein the at least one first prediction model is related to a prediction of the one or more items, and wherein the at least one first prediction model is selected based on the respective evaluation values of the at least two prediction models;
    updating, at the computing device, the at least one first prediction model to obtain at least one second prediction model; and
    displaying, on the display module, a second representation of the at least one modality of the one or more items, the second representation of the at least one modality of the one or more items generated using the at least one second prediction model.

2. The method of claim 1, wherein the user activity log data includes data relating to at least one of a user's choice on a plurality of buttons with regard to a modality of an item that are displayed on the display module, a time period while the user is looking at the modality of the item and other user's activities with regard to the modality of the item.

3. The method of claim 1, wherein updating the at least one first prediction model to generate the at least one second prediction model comprises training the at least one first prediction model based on the user activity log data.

4. The method of claim 1, wherein the at least one modality includes a plurality of modalities and the at least one first prediction model includes a plurality of first prediction models,
the method further comprises:
calculating weight values of the plurality of modalities based on the evaluation values of the plurality of first prediction models and the user activity log data;
training the plurality of first prediction models based on the user activity log data to generate a plurality of second prediction models;
predicting one or more items among the plurality of items to be presented to the user of the computing device based on the plurality of second prediction models;
calculating, for each of the predicted one or more items, prediction values of the plurality of modalities based on the plurality of second prediction models; and
generating a combined prediction value for each of the predicted one or more items based on the calculated prediction values and the calculated weight values.

5. The method of claim 4, further comprising:
updating, based on the combined prediction value for each of the predicted one or more items, the first representation to generate the second representation.

6. The method of claim 1, wherein the at least one modality includes modality X and modality Y, the at least one first prediction model includes a first prediction model of the modality X and a first prediction model of the modality Y, and the generated user activity log data includes user activity log data of the modality X and user activity log data of the modality Y, and
wherein evaluating the at least two prediction models comprises evaluating first prediction models of the modality X and the modality Y, respectively based on the user activity log data of the modality X and the modality Y to generate an evaluation value of the first prediction model of modality X and an evaluation value of the first prediction model of the modality Y, and
the method further comprises:
calculating a weight value of the modality X and a weight value of the modality Y, respectively based on the evaluation values of the first prediction model of the modality X and the first prediction model of the modality Y and also respectively based on the user activity log data of the modality X and the modality Y;
training the first prediction models of the modality X and the modality Y, respectively based on the user activity log data of the modality X and the modality Y to generate a second prediction model of the modality X and a second prediction model of the modality Y;
predicting one or more items among the plurality of items to be presented to the user of the computing device based on the second prediction models of the modality X and the modality Y;
calculating, for each of the predicted one or more items, a prediction value of the modality X and a prediction value of the modality Y based on the second prediction models of the modality X and the modality Y;
generating a combined prediction value for each of the predicted one or more items based on the calculated prediction values of the modality X and the modality Y and the calculated weight values of the modality X and the modality Y; and
updating, based on the combined prediction value for each of the predicted one or more items, the first representation to generate the second representation of at least one modality of the predicted one or more items.

7. The method of claim 1, further comprising:
initiating a training of the at least one first prediction model based on the user activity log data to generate the at least one second prediction model, if at least one of the following conditions is met:
a) when the amount of the generated user activity log data is above a first predetermined value;
b) when a generated evaluation value is above a second predetermined value;
c) when the computing device is in an idle state;
d) when the computing device is being charged; and
e) when a current time is within a time period set by the user.

8. The method of claim 7, further comprising:
stopping the training of the at least one first prediction model, if at least one of the following conditions is met:
a) when the computing device is executing an operation that requires a CPU usage over a third predetermined value; and
b) when the computing device is executing an operation that relates to online sales or online payment.

9. The method of claim 1, further comprising:
before the displaying, receiving an input from the user of the computing device;
obtaining preprocessed item data from a cache module of the computing device;
predicting the one or more items that are related with the input from the user and calculating a prediction value for each of the one or more items, based on the at least one first prediction model and by using the preprocessed item data; and
preparing the first representation based on the prediction value for each of the one or more items.

10. The method of claim 9, wherein the preprocessed item data is received from a server that is communicatively connected with the computing device.

11. The method of claim 9, wherein the preprocessed item data includes an extracted feature vector of each of at least one modality of each of the plurality of items.

12. The method of claim 1, further comprising:
before the displaying, receiving an input from the user of the computing device; and
obtaining the first representation from a cache module of the computing device,
wherein the first representation is generated by:
predicting the one or more items that are related with the input from the user and calculating a prediction value for each of the one or more items, based on the at least one first prediction model; and
preparing the first representation based on the prediction value for each of the one or more items.

13. The method of claim 1, further comprising:
if the at least one evaluation value does not meet one or more criteria, receiving at least one prediction model from a server that is communicatively connected with the computing device; and storing the received at least one prediction model in the memory module.

14. A computing device comprising:
a processor;
a display module; and
a memory module configured to store a plurality of prediction models and item data that includes data of a plurality of items, wherein the memory module is further configured to store instructions that, when executed by the processor, cause the processor to perform operations comprising:
- displaying, on the display module, a first representation of at least one modality of one or more items among the plurality of items;
- detecting an activity of a user of the computing device in response to displaying of the at least one modality of the one or more items to generate user activity log data;
- evaluating, at the computing device, at least two prediction models of the plurality of prediction models to generate respective evaluation values of the at least two prediction models;
- selecting, at the computing device, at least one first prediction model of the plurality of prediction models based on the user activity log data by generating at least one evaluation value of the at least one first prediction model, wherein the at least one first prediction model is related to a prediction of the one or more items, and wherein the at least one first prediction model is selected based on the respective evaluation values of the at least two prediction models;
- updating, at the computing device, the at least one first prediction model to obtain at least one second prediction model; and
- displaying, on the display module, a second representation of the at least one modality of the one or more items, the second representation of the at least one modality of the one or more items generated using the at least one second prediction model.

15. The computing device of claim 14, wherein the at least one modality includes a plurality of modalities and the at least one first prediction model includes a plurality of first prediction models, and
wherein the operations further comprise:
- calculating weight values of the plurality of modalities based on the evaluation values of the plurality of first prediction models and the user activity log data;
- training the plurality of first prediction models based on the user activity log data to generate a plurality of second prediction models;
- predicting one or more items among the plurality of items to be presented to the user of the computing device based on the plurality of second prediction models;
- calculating, for each of the predicted one or more items, prediction values of the plurality of modalities based on the plurality of second prediction models; and
- generating a combined prediction value for each of the predicted one or more items based on the calculated prediction values and the calculated weight values.

16. A non-transitory computer-readable storage medium having stored therein instructions executable by a computing device to cause the computing device to perform operations comprising:
- displaying, on a display module of the computing device, a first representation of at least one modality of one or more items among a plurality of items stored in a memory module of the computing device;
- detecting an activity of a user of the computing device in response to displaying of the at least one modality of the one or more items to generate user activity log data;
- evaluating, at the computing device, at least two prediction models of a plurality of prediction models to generate respective evaluation values of the at least two prediction models;
- selecting, at the computing device, at least one first prediction model of the plurality of prediction models based on the user activity log data by generating at least one evaluation value of the at least one first prediction model, wherein the at least one first prediction model is related to a prediction of the one or more items, and wherein the at least one first prediction model is selected based on the respective evaluation values of the at least two prediction models;
- updating, at the computing device, the at least one first prediction model to obtain at least one second prediction model; and
- displaying, on the display module, a second representation of the at least one modality of the one or more items, the second representation of the at least one modality of the one or more items generated using the at least one second prediction model.

17. The non-transitory computer-readable storage medium of claim 16, wherein the at least one modality includes a plurality of modalities and the at least one first prediction model includes a plurality of first prediction models, and wherein the operations further comprise:
- calculating weight values of the plurality of modalities based on the evaluation values of the plurality of first prediction models and the user activity log data;
- training the plurality of first prediction models based on the user activity log data to generate a plurality of second prediction models;
- predicting one or more items among the plurality of items to be presented to the user of the computing device based on the plurality of second prediction models;
- calculating, for each of the predicted one or more items, prediction values of the plurality of modalities based on the plurality of second prediction models; and
- generating a combined prediction value for each of the predicted one or more items based on the calculated prediction values and the calculated weight values.

* * * * *